(12) United States Patent
Naskar et al.

(10) Patent No.: US 11,384,219 B2
(45) Date of Patent: Jul. 12, 2022

(54) CARBON SUPPORTS FOR OXYGEN REDUCTION CATALYSTS

(71) Applicants: UT-Battelle, LLC, Oak Ridge, TN (US); Georgia Institute of Technology, Atlanta, GA (US); University of Tennessee Research Foundation, Knoxville, TN (US)

(72) Inventors: Amit K. Naskar, Knoxville, TN (US); Mariappan Paranthaman, Knoxville, TN (US); Xuan Yang, Newark, DE (US); Younan Xia, Atlanta, GA (US); Zachary D. Hood, Atlanta, GA (US); Yunchao Li, Novi, MI (US)

(73) Assignees: UT-BATTELLE, LLC, Oak Ridge, TN (US); UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 0 days.

(21) Appl. No.: 15/961,978

(22) Filed: Apr. 25, 2018

(65) Prior Publication Data

US 2019/0330440 A1    Oct. 31, 2019

(51) Int. Cl.
| | |
|---|---|
| C08J 11/12 | (2006.01) |
| C08J 11/28 | (2006.01) |
| H01M 4/92 | (2006.01) |
| C09C 1/48 | (2006.01) |

(52) U.S. Cl.
CPC .......... *C08J 11/12* (2013.01); *C08J 11/28* (2013.01); *C09C 1/482* (2013.01); *H01M 4/926* (2013.01); *C08J 2317/00* (2013.01)

(58) Field of Classification Search
None
See application file for complete search history.

(56) References Cited

U.S. PATENT DOCUMENTS

| | | |
|---|---|---|
| 4,244,793 A | 1/1981 | Johnson et al. |
| 5,998,328 A | 12/1999 | Dawes et al. |
| 9,276,268 B2 | 3/2016 | Wieland |
| | (Continued) | |

OTHER PUBLICATIONS

Liu et al.; Hydrogen Production by Catalystic Dehydrogenation of Methylcyclohexane over Pt Catalysts Supported on Pyrolytic Waste Tire Char; International Journal of Hydrogen Energy; 36, p. 8902-8907; 2011.*

(Continued)

*Primary Examiner* — Guinever S Gregorio
(74) *Attorney, Agent, or Firm* — Fox Rothschild LLP (57) ABSTRACT

The invention provides a method of making a electrocatalyst from waste tires. The method comprises the steps of providing rubber pieces; optionally contacting the rubber pieces with a sulfonation bath to produce sulfonated rubber; pyrolyzing the rubber to produce tire-derived carbon composite comprising carbon black, wherein the pyrolyzing comprises heating to at least 200° C.-2400° C.; activating the tire-derived carbon composite by contacting the tire-derived carbon composite with an alkali anion compound to provide activated tire-derived carbon supports; and loading the activated carbon-based supports with platinum cubes. In another embodiment, the tire-derived carbon composite is activated by annealing in a carbon dioxide atmosphere.

13 Claims, 7 Drawing Sheets

(56) References Cited

U.S. PATENT DOCUMENTS

| | | | |
|---|---|---|---|
| 9,884,804 B2 | 2/2018 | Hood | |
| 2016/0254543 A1* | 9/2016 | Naskar | H01M 10/0525 429/231.8 |
| 2017/0342014 A1* | 11/2017 | Hood | C07C 67/08 |

OTHER PUBLICATIONS

Skodras; Enhanced Mercury Adsorption in Activated Carbons from Biomass Materials and Waste Tires; Fuel Processing Technology; 88, 749-758; 2007.*

Ermete Antolini, "Carbon supports for low-temperature Fuel Cell Catalysts", Applied Catalysis B: Environmental, 2009, pp. 1-24, vol. 88.

M. Boota, et a., "Waste Tire Derived Carbon-Polymer Composite Paper as Pseudocapacitive Electrode with Long Cycle Life", ChemSusChem, 2015, pp. 3576-3581, vol. 8.

Chun-Wei Chen and Mitsuru Akashi, "Synthesis, Characterization, and Catalytic Properties of Colloidal Platinum Nanoparticles Protected by Poly(N-isopropylacrylamide)", Langmuir, 1997, pp. 6465-6472, vol. 13.

Sang-Il Choi, "Facile Synthesis of Platinum Octahedra and Cubes Through the Manipulation of Reduction Kinetics", Advanced Powder Technology, 2016, pp. 1862-1867, vol. 27.

Sang-Il Choi, et al., "Synthesis and Characterization of 9 nm Pt—Ni Octahedra with a Record High Activity of 3.3 A/mgPt for the Oxygen Reduction Reaction", Nano Letters, 2013, pp. 3420-3425, vol. 13.

Andrew L. Dicks, "The Role of Carbon in Fuel Cells", Journal of Power Sources, 2006, pp. 128-141, vol. 156.

Zachary D. Hood, et al., "Novel Acid Catalysts from Waste-Tire-Derived Carbon: Application in Waste-to-Biofuel Conversion", Chemistry Select, 2017, pp. 4975-4982, vol. 2.

Yunchao Li, et al., "Tire-Derived Carbon Composite Anodes for Sodium-Ion Batteries", Journal of Power Sources, 2016, pp. 232-238, vol. 316.

Amit K. Naskar, et al., "Tailored Recovery of Carbons from Waste Tires for Enhanced Performance as Anodes in Lithium-Ion Batteries", Royal Society of Chemistry, 2014, p. 38213-38221, vol. 4.

Deborah Pedone, et al., "Platinum Nanoparticles in Nanobiomedicine", Chem. Soc. Rev., 2017, pp. 4951-4975, vol. 46.

Yan-Jie Wang, et al., "Carbon-Supported Pt-Based Alloy Electrocatalysts for the Oxygen Reduction Reaction in Polymer Electrolyte Membrane Fuel Cells: Particle Size, Shape, and Composition Manipulation and Their Impact to Activity", Chemical Review, 2015, pp. 3433-3467, vol. 115.

Xuan Yang, et al., "Synthesis and Characterization of Pt—Ag Alloy Nanocages with Enhanced Activity and Durability toward Oxygen Reduction", Nano Letters, 2016, pp. 6644-6649, vol. 16.

Byeong-Chul Yu, et al., "A New Approach for Recycling Waste Rubber Products in Li—S Batteries", Energy Environ. Sci., 2017, pp. 86-90, vol. 10.

Jun Zhang, et al., "Synthesis and Oxygen Reduction Activity of Shape-Controlled Pt3Ni Nanopolyhedra", Nano Letters, 2010, pp. 638-644, vol. 10.

Jun Zhang and Jiye Fang, "A General Strategy for Preparation of Pt 3d-Transition Metal (Co, Fe, Ni) Nanocubes", J. Am. Chem. Soc., 2009, pp. 18543-18547, vol. 131.

Lei Zhang, et al., "Platinum-Based Nanocages with Subnanometer-Thick Walls and Well-Defined, Controllable Facets", Nanocatlysts, 2015, pp. 412-416, vol. 349.

Mingjia Zhi, et al., "Effects of Pore Structure on Performance of an Activated-Carbon Supercapacitor Electrode Recycled from Scrap Waste Tires", ACS Sustainable Chem. Eng., 2014, pp. 1592-1598, vol. 2.

Yaovi Holade, et al., "Enhancing the available specific surface area of carbon supports to boost the electroactivity of nanostructured Pt catalysts," Phys. Chem. Chem. Phys., 2014, pp. 25609-25620, vol. 16.

Isilay Ozdemir, et al., "Preparation and characterization of activated carbon from grape stalk by zinc chloride activation," Fuel Processing Technology, 2014, pp. 200-206, vol. 125.

S.M. Yakout and G. Sharaf El-Deen, "Characterization of activated carbon prepared by phosphoric acid activation of olive stones," Arabian Journal of Chemistry, 2016, pp. S1155-S1162, vol. 9.

International Search Report, pct/us2019/029135, dated Mar. 17, 2020.

* cited by examiner

CARBON SUPPORTS FOR OXYGEN REDUCTION CATALYSTS

STATEMENT REGARDING FEDERALLY SPONSORED RESEARCH OR DEVELOPMENT

This disclosure was made with government support under a research project supported by Contract No. DE-AC05-00OR22725 awarded by the U.S. Department of Energy. The government has certain rights in this disclosure.

BACKGROUND OF THE DISCLOSURE

Carbon-based supports for electrocatalysis are under intense study due to their application for a multitude of reactions, including carbonyl reduction, reduction of nitro compounds, the oxygen reduction reaction (ORR) at the cathode of fuel cells, among other hydrogenation reactions. In particular, the activity of catalysts towards such reactions have largely been improved by manipulating the electrochemically active surface area. At present, the typical support material for catalysts used for the ORR are based on Pt nanoparticles (3-5 nm in size) is carbon black. The selection of the support material is important since it largely determines the concentration of active surface towards ORR activity. Ideally, the support will 1) hold high electrical conductivity, 2) permit electron flow to the active surface of the electrocatalyst, and 3) be synthesized at a low cost. Nanostructured carbon materials, such as carbon nanotubes, carbon nanofibers, and ordered/disordered mesoporous carbon, are attractive supports, but such carbons are produced from relatively expensive precursors and, in some cases, require lengthy and costly processing methods.

SUMMARY OF THE DISCLOSURE

In one aspect, the invention provides a method of making a electrocatalyst from waste tires. The method comprises the steps of providing rubber pieces; optionally contacting the rubber pieces with a sulfonation bath to produce sulfonated rubber; pyrolyzing the rubber to produce tire-derived carbon composite comprising carbon black, wherein the pyrolyzing comprises heating to at least 200° C.-2400° C.; activating the tire-derived carbon composite by contacting the tire-derived carbon composite with an alkali anion compound to provide activated tire-derived carbon supports; and loading the activated carbon-based supports with platinum cubes.

In another aspect, the invention provides a method of making a electrocatalyst from waste tires. The method comprises the steps of providing rubber pieces; optionally contacting the rubber pieces with a sulfonation bath to produce sulfonated rubber; pyrolyzing the rubber to produce tire-derived carbon composite comprising carbon black, wherein the pyrolyzing comprises heating to at least 200° C.-2400° C.; activating the tire-derived carbon composite by annealing in a carbon dioxide atmosphere to provide activated tire-derived carbon supports; and loading the activated carbon-based supports with platinum cubes.

BRIEF DESCRIPTION OF THE FIGURES

FIG. 1. Typical SEM images of different carbon supports: (A) carbon 1, (B) carbon 2, (C) carbon 3, and (D) Ketjen-300.

FIG. 2. A) XRD patterns of the different carbon supports. B) TGA thermograms and C) derivative TGA thermograms of the different carbon supports heated at 10° C. min$^{-1}$ under air (flow rate=20 mL min$^{-1}$).

FIG. 3. Typical TEM images of Pt nanocubes on different carbon supports: (A) carbon 1, (B) carbon 2, (C) carbon 3, and (D) Ketjen-300.

FIG. 4. (A) Cyclic voltammograms, (B) linear sweep voltammograms, (C) mass activities, and (D) specific ECSAs of Pt nanocubes on different carbon supports and Ketjen-300.

FIG. 5. X-ray photoelectron spectra of the different carbon supports: (A) carbon 1, (B) carbon 2, (C) carbon 3, and (D) Ketjen-300.

FIG. 7. Linear sweep voltammograms and Koutecky-Levich plots of Pt nanocubes on different carbon supports at different rotation rates and potentials, respectively. (A, B) carbon 1, (C, D) carbon 2, (E, F) carbon 3, and (G, H) Ketjen-300.

DETAILED DESCRIPTION OF THE DISCLOSURE

In one aspect, the invention provides a method for preparing a carbon-based support for electrocatalysis. In one embodiment, the carbon-based support is made from waste tires or other rubber sources. The method comprises providing rubber pieces and optionally contacting the rubber pieces with a sulfonation bath to produce sulfonated rubber. The rubber pieces can include carbon black filled cross-linked rubber chunks. Carbon black is amorphous or non-crystalline.

In one embodiment, the rubber pieces can optionally be subjected to a pre-sulfonation process. The pre-sulfonation process is useful for removing oils and solvents from rubber sources, such as waste tires. The pre-sulfonation process comprises a heat treatment step. The heat treatment step includes heating the rubber pieces to a temperature of up to 200° C. to 400° C. in inert atmosphere followed by cooling to room temperature.

In one embodiment, the rubber pieces are optionally sulfonated. The method of sulfonating the rubber can vary. In one embodiment, the temperature of the sulfonation bath can be between −20° C. to 200° C. The rubber pieces can be contacted with the sulfonation bath for between 30 min and 5 days. The sulfonation bath can include a concentration of sulfuric acid, or fuming sulfuric acid, or chlorosulfonic acid, or $SO_3$ gas containing fluid that is suited to the rubber composition and the conditions of the sulfonation.

The rubber pieces can be any suitable size, such as between 100 nm and 2 inches. The rubber pieces can comprise rubber particles of between 100 nm and 0.5 mm and rubber crumbs of between 0.5 mm to 2 inches.

The sulfonated rubber pieces or non-sulfonated rubber pieces are pyrolyzed to produce a rubber (e.g., tire) derived porous carbon composite comprising carbon black embedded in carbon matrix with graphitized interface portions. The graphitized interface portions can comprise 10%-40% of the tire-derived carbon composite, by weight. The graphitized portion can comprise a layer spacing of between 3.5-4.7 angstroms. The presence of the outer graphitized shell preserves the carbon black within and raises yield and provides the correct pore volume characteristics.

The pyrolysis can be conducted by any suitable process. The pyrolyzing can comprise heating to at least 200° C. to 2400° C., or 900° C. to 1200° C. In one embodiment, pyrolysis occurs at about 1100° C. The pyrolyzing can comprise at least two-stage heating. A first stage heating can comprise heating to between room temperature and 400° C.

at 1° C./min, and a second stage heating can comprise heating to between 400 and 2400° C. at 2° C./min. The heating rates in both stages can be as high as 50° C./min. The pyrolyzing time can be between 1 min and 24 hours. The pyrolyzing can be conducted in an inert atmosphere, such as under nitrogen gas.

The carbon-based support contains a mixed meso-microporosity between 1-10 nm or between about 1-5 nm, with both micropores of less than 2 nm, and mesopores of preferably 5-20 nm, or 2-50 nm. In one embodiment, the pores are between 7-18 nm. The pores can have between 70%-90% micropores and between 10%-30% mesopores. The specific surface area of the carbon catalyst is generally between 1-2000 m$^2$/g. In one embodiment, the surface area is in the range of 200-1600 m$^2$/g. The porous carbon composite generally has a pore volume of 0.0100-0.1000 m$^3$ g$^{-1}$.

Next, the rubber-derived porous carbon can be activated by contacting the carbon with an alkali anion compound. Any alkali can be used. For example, the alkali can be sodium, lithium, potassium, rubidium, cesium and francium. The anion can be any anion. Examples of suitable anions include, for example, hydroxide, a halide such as chlorine, and phosphate. In one embodiment, the alkali is potassium and the anion is hydroxide. Other suitable alkali anion compounds include, for instance, $ZnCl_2$ and $H_3PO_4$.

Many processes for activating carbon are known, and any suitable method can be utilized. The method can comprise contacting the carbon with an alkali hydroxide described above. The alkali hydroxide can be contacted with the carbon at a weight ratio of between, for instance, 0.01-50 wt. %. In one embodiment, the weight ratio is about 25 wt. % alkali hydroxide and 75 wt. % carbon.

The contacting step can include, for example, mixing, stirring, sonication, annealing, dehydrogenation, etc. The components can be suspended in any suitable aqueous media, such as water or organic media such as alcohol, toluene, hexane, etc. Mild to strong sonication with frequencies, such as, for example, >10 kHz, can be used to disperse the alkali hydroxide into the pores of the carbon-based support. The sonication time can vary from, for example, 60 sec to a few or several hours. In one embodiment, the carbon can be mixed and ground with the alkali hydroxide.

Alternatively, the rubber-derived porous carbon is activated by annealing in a carbon dioxide atmosphere. For example, a flow of carbon dioxide is passed through a tube furnace while the furnace is ramped to a predetermined temperature for a set amount of time.

After activating, the water can be removed by any method known to those skilled in the art. For example, the water can be removed by thermal evaporation, heating, etc.

In another embodiment, the activated carbon is subjected to pyrolysis using the parameters as described above.

The carbon generally recovered from waste tires or other rubber sources can be a minimum of about 10 wt. %. The maximum can be about 50 wt. %. The structure of the catalyst is typically composed of meso/micropores with a granular morphology.

The activated carbon-based supports are loaded with platinum cubes. The platinum can be any platinum group metals. Examples of platinum group metals include palladium, rhodium, and ruthenium.

The platinum cubes can be synthesized by any method known to those skilled in the art. For example, platinum cubes with an average edge length of ~10 nm by mixing platinum(II) acetylacetonate, oleylamine, and oleic acid in a three-neck flask fitted with a condenser. This mixture is heated to 130° C. with vigorous stirring under a flow of argon. Next, tungsten hexacarbonyl was added to the solution and the temperature was subsequently raised to 230° C. with vigorous stirring for 45 min. Pt cubes were isolated by centrifugation and washed with toluene several times. The Pt cubes were finally re-dispersed in toluene forming a suspension.

Any method suitable for loading the platinum cubes onto the activated carbon-based supports can be utilized. Suitable methods, for example, include mixing the components together, sonication, etc.

The activated carbon-based supports generally can contain a minimum of about 0.1, 0.5, 1.0, 10, 20, or 30 wt. % of platinum cubes. The maximum can be about 50, 45, 40, or 35 wt. %. In one embodiment, the activated carbon-based support contains about 20 wt. % platinum cubes.

In one embodiment, a catalyst can further be dispersed on the platinum cube activated carbon-based supports. Any catalyst can be used. Examples of suitable catalysts include transition metals and noble metals. Examples of transition metals include iron, cobalt, and nickel. Examples of noble metals include gold and silver.

In another aspect, the present invention provides a method for oxygen reduction reaction (ORR) at the cathode of fuel cells to convert oxygen to water. The ORR represents an important reaction that generate electricity through redox. Thus, the Pt-loaded carbon-based supports (i.e., electrocatalyst) of the present invention can be used in a method for converting $O_2$ into water. The method includes contacting the electrocatalyst, described above, with $O_2$ bubbled through an aqueous solution, while the electrocatalyst is electrically configured as a cathode. More particularly, the method includes contacting the above-described electrocatalyst with a source of oxygen, to convert oxygen to water. The electrocatalyst is used at the cathode of a fuel cell and is in electrical communication with a counter electrode electrically powered as an anode. A voltage is then produced across the anode and the electrocatalytic cathode in order for the electrocatalytic cathode to electrochemically convert the oxygen to water.

Generally, the voltage across the working electrode 12 (i.e., cathode) and the counter electrode 14 (i.e. anode) is at least 0.05 V, or within 0-1.5 V, or within −1.5-1.5 V, or within −5-5 V, for converting oxygen into water. The voltage can be applied by any method known to those skilled in the art. For example, the voltage can be applied using a potentiostat. The oxygen is generally converted to water at an efficiency of at least about 40%, 50%, 60%, 65%, 70%, 75%, or 80%.

In further embodiment, the electrocatalyst of the present invention can be utilized in other electrochemical reactions, such as carbonyl reduction, reduction of nitro compounds, and other hydrogenation reactions.

Examples have been set forth below for the purpose of illustration and to describe certain specific embodiments of the invention. However, the scope of this invention is not to be in any way limited by the examples set forth herein.

EXAMPLES

Example 1: Synthesis of Carbon Supports

Carbon supports were synthesized following a previously reported procedure with some modification. Carbon 1 was fabricated by heating tire crumbs to 200° C. to extract liquid oil from the tire crumbs. The resulting tire crumbs were then pyrolyzed at 1100° C. with a heating ramp of 2° C./min; the furnace was then immediately cooled to room temperature. Carbon 2 was produced by activating Carbon 1 with KOH. To complete the KOH activation, KOH was ground using a mortar and pestle with Carbon 1 in a 4:1 mass ratio and subsequently pyrolyzed using the heating parameters outlined above. Carbon 3 was synthesized by digesting tire crumbs in a sulfuric acid bath maintained at 110° C. for about 12 hours and the resulting mass was washed with copious amounts of water and then pyrolyzed at 800° C. under flowing nitrogen gas. The furnace ramp rate was ramped from 25° C. to 400° C. at 1° C./min and further increased to 800° C. at 2° C./min; the furnace was then immediately cooled to room temperature. As a control, Ketjen-300 was obtained from a commercial source and used as received.

Example 2: Synthesis of Pt Cubes and Protocol to Disperse Pt Cubes on the Carbon Supports Pt cubes were synthesized using a previously reported procedure. Briefly, 0.020 g of platinum(II) acetylacetonate, 8.0 mL of oleylamine, and 2.0 mL of oleic acid were loaded into a three-neck flask equipped with a condenser and attached to a Schlenk line. The mixture was heated to 130° C. with vigorous stirring under an argon stream. Next, 0.05 g of tungsten hexacarbonyl was added into the solution, and the temperature was subsequently raised to 230° C. and kept for 45 min with vigorous agitation. The resultant products were isolated by centrifugation and washed with toluene for several cycles, followed by a size-selection treatment. The Pt cubes were finally re-dispersed in toluene, forming a colloidal suspension. For the loading of Pt cubes on the carbon supports, the nanocrystal suspension was added to another suspension containing a specific amount of porous carbon supports to obtain a loading of about 20 wt. % for Pt. The mixture was then ultrasonicated for 3 h, and the resulting Pt cubes/C was collected by centrifugation, re-dispersed in 10 mL of acetic acid, and heated at 60° C. for 3 h to remove surfactants on the surface of the particles. The Pt cubes/C catalyst was washed ten times with water and re-disperse in water for further use.

Example 3: Characterization

X-ray diffraction patterns were collected on a PANalytical X'Pert Pro with a Cu $K_\alpha$ X-ray tube. All data were processed with HighScore Plus, a software package supplied by PANalytical. Brunauer-Emmett-Teller (BET) surface area measurements were collected on a Micromeritics Gemini VI Surface Area and Pore Density Analyzer. Thermal gravimetric analysis (TGA) was performed on a TA Discovery instrument using a ramp rate of 10° C. $min^{-1}$ and an air flow rate of 20 mL $min^{-1}$. Scanning electron microscopy (SEM) images were collected on a Zeiss Merlin with a gun acceleration of 10.0 kV. Transmission electron microscopy (TEM) images were collected on a Hitachi 7700 operated at 120.0 kV by drop casting Pt-loaded carbon supports onto copper grids. X-ray photoelectron spectroscopy (XPS) spectra were collected for each powder sample on a Thermo K-Alpha XPS system with a spot size of 400 m and a resolution of 0.1 eV. Direct current (DC) resistances were measured in a specialized, pressurized cell by cold pressing 70 mg of each carbon at 300 MPa for 1 min using stainless steel blocking electrodes (½") and using a Fluke 115 multimeter.

Example 4: Electrochemical Measurements

All electrochemical measurements were collected using conditions from our previous studies. A glassy carbon RDE was connected to a CHI 600E potentiostat (CH instruments). A Pt mesh and a Hydroflex hydrogen reference electrode (Gasktel) were used as the counter and reference electrodes, respectively. For all reported electrochemical measurements, the potentials were converted to values in reference to the reversible hydrogen electrode (RHE). 0.1 M $HClO_4$ was used as the electrolyte, which was prepared by diluting a 70% stock solution with DI water. Each CV curve was recorded at room temperature using a $N_2$-saturated 0.1 M $HClO_4$ solution over the potential range of 0.08-1.1 $V_{RHE}$ using a scanning rate of 50 mV $s^{-1}$. The specific ECSA was calculated based on the charges associated with desorption of hydrogen in the region of 0.08-1.1 $V_{RHE}$ using a scanning rate of 50 mV $s^{-1}$. The specific ECSA was calculated based on the charges associated with the desorption of hydrogen in the region of 0.08-0.45 $V_{RHE}$. The ORR activity of each sample was measured at room temperature over the potential range of 0.08-1.1 $V_{RHE}$ in an $O_2$-saturated 0.1 M $HClO_4$ solution through the RDE method as a scanning rate of 10 mV $s^{-1}$ and a rotation rate of 1,600 rpm. The background current was measured in the potential range of 0.08-1.1 $V_{RHE}$ by running the ORR sweep profile in an $N_2$-saturated 0.1 M $HClO_4$ solution at a scanning rate of 10 mV $s^{-1}$ and a rotation rate of 1,600 rpm. The ORR data were corrected by background currents and ohmic iR drop compensation.

Example 5: Microstructure, Surface Areas, and Pore Distributions

All carbons display had unique microstructures, surface areas, and pore distributions. FIGS. 1A-1D display typical scanning electron microscopy (SEM) images of the as-prepared tire-derived carbons and Ketjen-300. Carbons 1 and 2 were composed of overall smaller particles than Carbon 3. In particular, the microstructure of Carbon 2 was similar to Ketjen-300, as evidenced by the SEM images in FIGS. 1B and 1D, the average particle size was sub-micron for both Carbon 2 and Ketjen-300.

Figure 6:
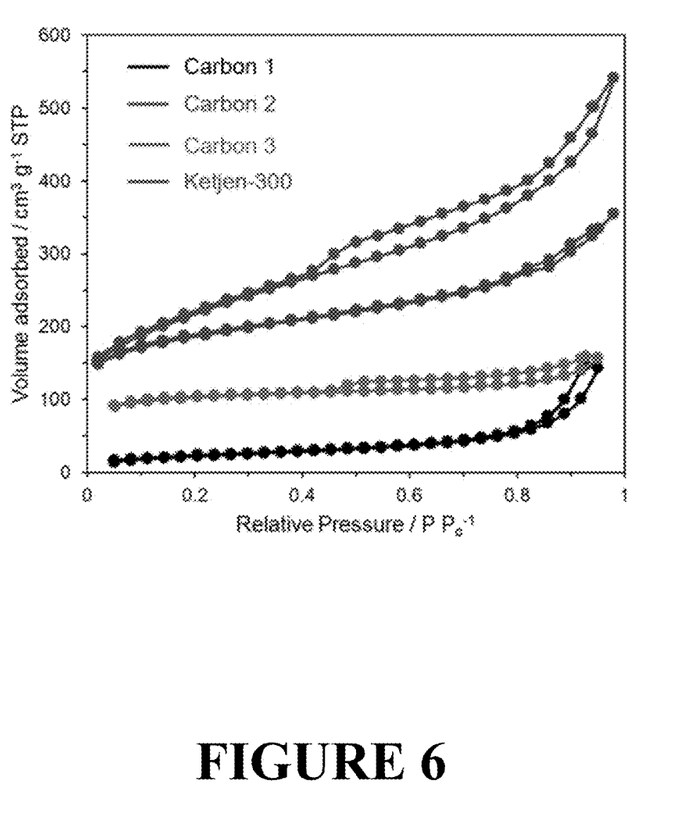
FIG. 6. $N_2$ adsorption-desorption isotherms of tire-derived carbons and Ketjen-300.
Figure 7A:
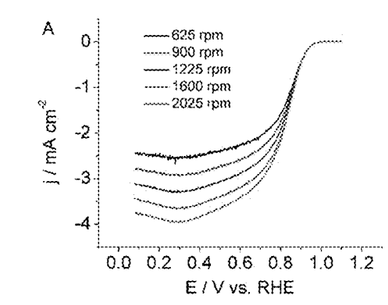
Figure 7B:
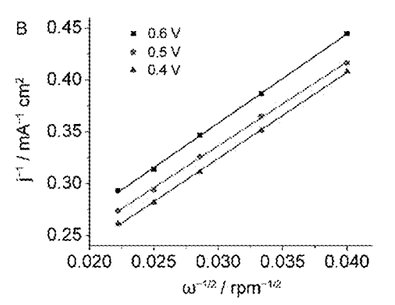
Figure 7C:
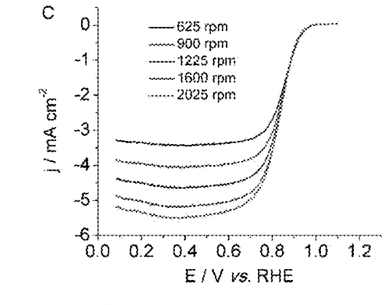
Figure 7D:
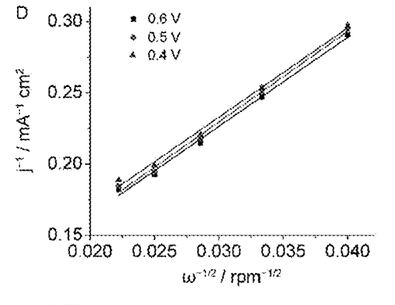
Figure 7E:
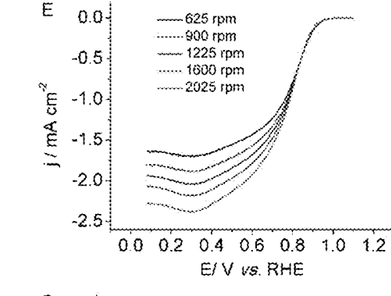
Figure 7F:
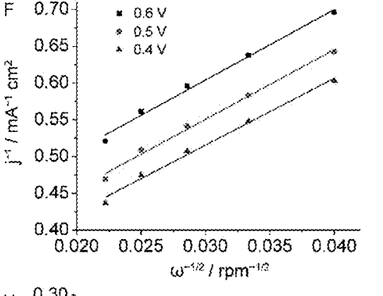
Figure 7G:
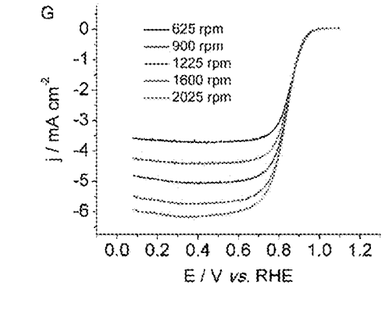
Figure 7H:
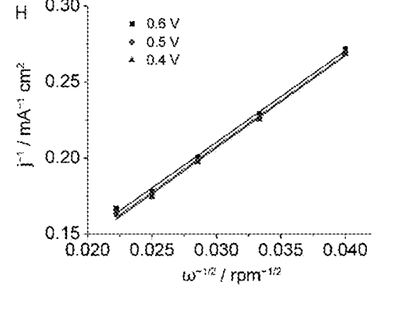

Brunauer-Emmett-Teller (BET) surface areas and BJH adsorption pore diameter measurements were collected for all carbon with the results summarized in Table 1. Isotherms are shown in FIG. 6. Among the carbons explored in this study, Carbon 1 has the smallest surface area (53.62 $m^2/g$) and largest average pore diameter (10.9 nm), but after activation with KOH to produce Carbon 2, the BET surface area increased to 479.6 $m^2/g$ and BJH adsorption average pore diameter decreased to 5.3 nm. Carbon 3, prepared by a sulfuric acid pretreatment, had a BET surface area of 331.05 $m^2/g$ and a BJH adsorption average pore diameter of 9.3 nm. In comparison, Ketjen-300 had a BET surface area of 750.68 $m^2/g$ and a BJH adsorption average pore diameter of 5.8 nm.

TABLE 1

BET surface areas, pore sizes of different carbon supports, and the electron transfer number of Pt nanocubes on different carbon supports.

| Carbon Support | BET Surface Area ($m^2/g$) | Adsorption Average Pore Diameter (nm) | Electron Transfer Number at 0.4 V |
|---|---|---|---|
| Carbon 1 | 53.62 | 10.9 | 2.9 |
| Carbon 2 | 479.61 | 5.3 | 3.9 |
| Carbon 3 | 331.05 | 9.3 | 2.7 |
| Ketjen-300 | 750.68 | 5.8 | 4 |

Figures 1A, 1B, 1C, 1D:
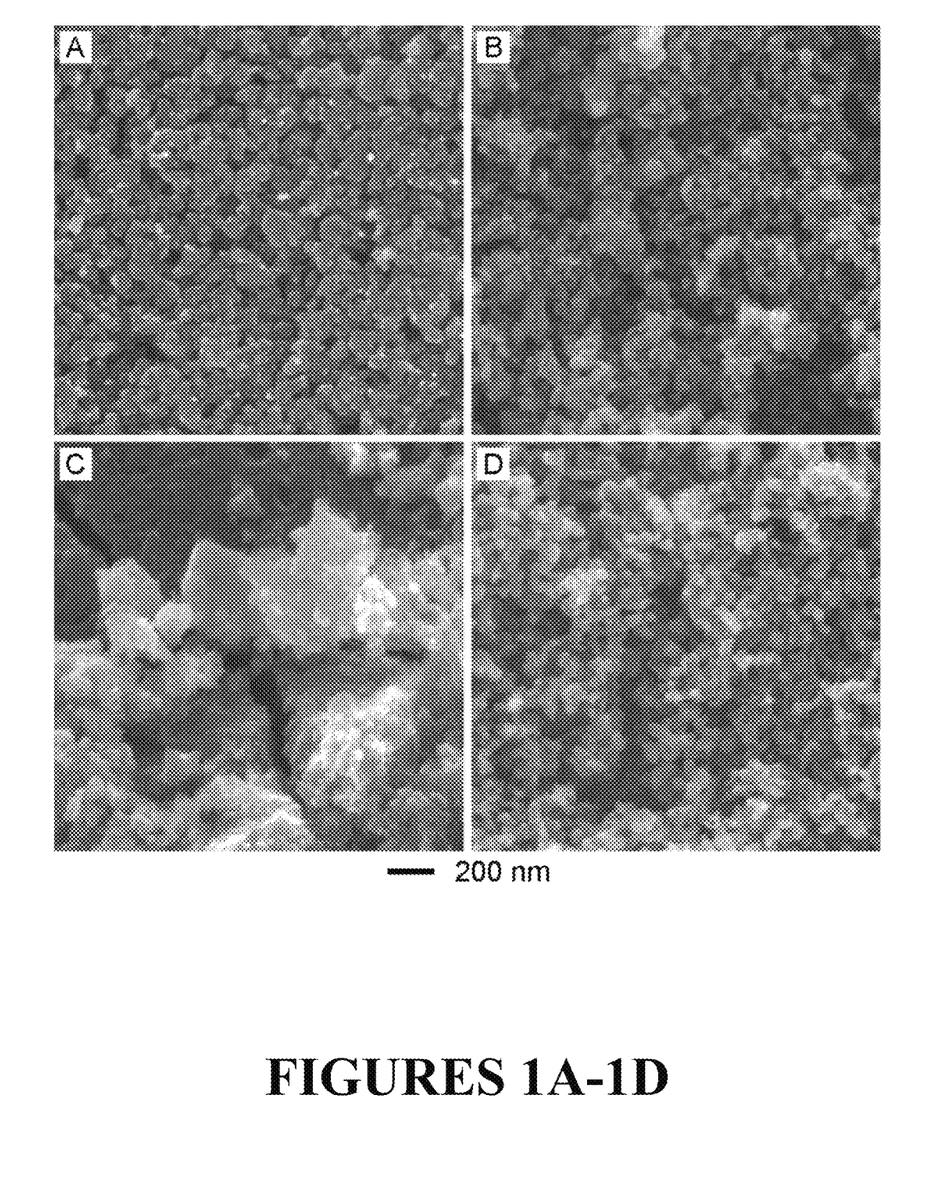
Figure 2A:
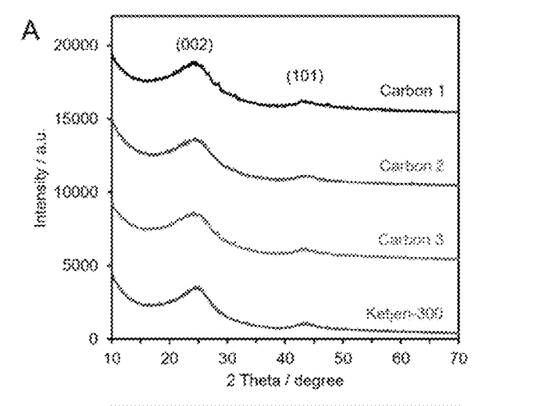

Example 5: X-Ray Diffraction (XRD) and x-Ray Photoelectron Spectroscopy Analysis The crystallinity and surface chemistry of tire-derived carbons and Ketjen-300 was evaluated by powder x-ray diffraction (XRD) and x-ray photoelectron spectroscopy (XPS). XRD analysis of the carbons are shown in FIG. 2A, where each catalyst shows a broad diffraction peak at 2θ=10-30° and a weaker diffraction peak at between 2θ=40-50°, which can be attributed to the (002) and (101) planes for amorphous graphitic carbon. Graphitic carbon is especially of interest for electrocatalysis for its thermal stability, thermal conduction, chemical inertness, and thermal transport, which are all important for a number of useful reaction such as the ORR, which typically is run at increased temperatures. From XPS analysis of the different carbon materials (FIG. 5), it can be seen that the surface chemistry is similar apart from the difference in sulfur content in the tire-derived carbons. Carbons 1 and 3 were found to have significant amounts of surficial thiophenic carbon, while Carbon 2 and Ketjen-300 had no detectable sulfur on the surface of the carbon particles as evidenced by the S 2p spectra. The C1s and O 1s spectra of each carbon suggest that most of the carbon is $sp^3$ or $sp^2$ hybridized with some sp hybridization.

Example 6: Thermal Gravimetric Analysis

Figure 2B:
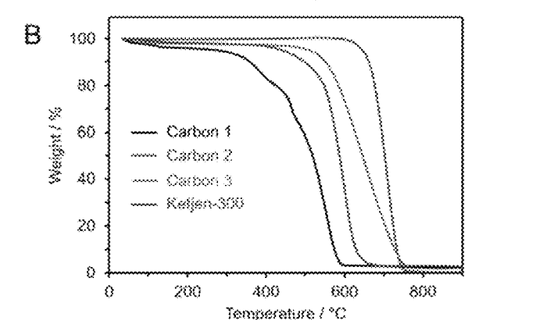
Figure 2C:
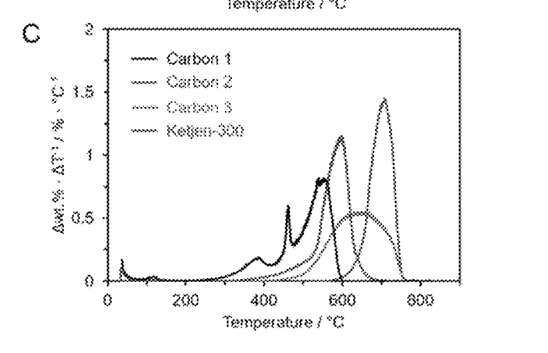
Figure 3A:
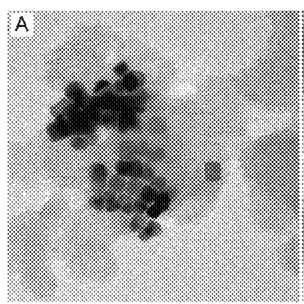
Figure 3B:
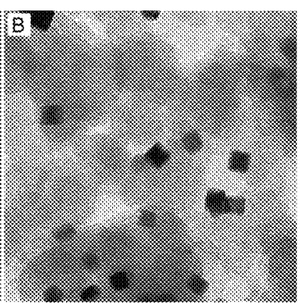
Figure 3C:
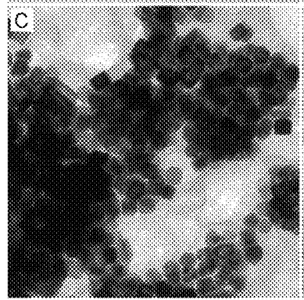
Figure 3D:
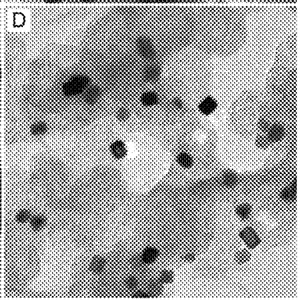

Thermal gravimetric analysis (TGA) was performed under a flow of air (20 mL min$^{-1}$) to determine the compositional and thermal characteristics of each carbon support (FIGS. 2B and 2C). All tire-derived carbons were thermally stable to temperatures >300° C. under air. Carbon 1 started to decompose at ~325° C., possibly due to the presence of diene rubbers in the carbon, while the first weight loss of Carbon 2 started at ~400° C. The first weight loss of Carbon 3 started at nearly 500° C., suggesting that most of the carbon remaining after the sulfuric acid treatment and pyrolysis was carbon black. In comparison, Ketjen-300 decomposes at temperatures >600° C. since it is primarily composed of carbon black.

Example 7: Pt-Loaded Carbon Supports

To investigate the ability of each carbon to support Pt-based electrocatalysts, Pt cubes were synthesized with an average edge length of ~10 nm based on previous reports. In short, 0.020 g of platinum(II) acetylacetonate, 8.0 mL of oleylamine, and 2.0 mL of oleic acid were mixed in a three-neck flask fitted with a condenser. This mixture was heated to 130° C. with vigorous stirring under a flow of argon. Next, 0.05 g of tungsten hexacarbonyl was added to the solution and the temperature was subsequently raised to 230° C. with vigorous stirring for 45 min. The products were isolated by centrifugation and washed with toluene several times. The Pt cubes were finally re-dispersed in toluene forming a suspension. The Pt cubes were then loaded onto the tire-derived carbons and Ketjen-300 for evaluation towards ORR activity.

To load Pt cubes on the carbon supports, the nanocrystal suspension was added to another suspension containing the carbon supports to achieve a loading of about 20 wt. % for Pt. Each mixture was ultrasonicated for 3 h, and the resulting Pt cubes/C was collected by centrifugation, re-dispersed in 10 mL of acetic acid, and heated at 60° C. for 3 h to remove surfactants. The Pt cubes/C catalyst were washed by centrifugation ten times with D.I. water. FIG. 3 shows typical TEM images of the Pt cubes, with an average edge length of ~10 nm, dispersed on the different carbon supports. The dispersity of Pt cubes was similar on Carbon 2 and Ketjen-300, displaying an increased electrochemically active surface area. On the other hand, Pt cubes were not dispersed homogenously on Carbons 1 and 3, possibly due to the pore structure and the presence of organosulfates on the surface of these carbons.

Example 8: Oxygen Reduction Reaction (ORR)

Figure 4A:
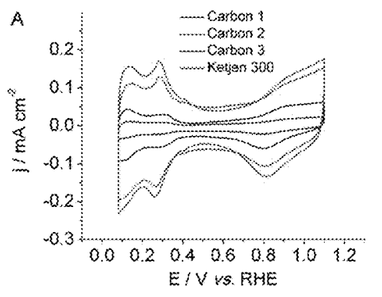

The catalytic activity towards the ORR was evaluated for the Pt nanocubes dispersed on the different carbon supports. FIG. 4A shows the cyclic voltammograms (CVs) for different catalysts in the potential range 0.08-1.1 $V_{RHE}$ using a scanning rate of 50 mV s$^{-1}$. All catalysts have a peak located close to 0.3 V, which can be attributed to hydrogen desorption from the [100] facets. The specific electrochemical surface area (ECSA) was calculated for each carbon by averaging the charge from the hydrogen adsorption/desorption peaks, which were in the range of 0.08-0.45 $V_{RHE}$ and normalizing these peaks by the Pt mass on each electrode during CV measurements. The Pt nanocubes on Ketjen-300 held a specific ECSA of nearly 18.5 m$^2$ g$^{-1}$, while Carbon 2 held a value of nearly 13.2 m$^2$ g$^{-1}$. Both Carbon 1 and 3 have specific ECSA values less than 7 m$^2$ g$^{-1}$. The direct current (DC) resistance was measured through ½" pellets of each carbon in order to determine the electronic conductivity of each carbon (Table 1). Carbon 1 and 3 has overall higher resistances, signifying a lower electronic conductivity. Carbon 1 and Ketjen-300, on the other hand, had similar values for a DC resistance, further explaining the similarity in the specific ECSA for these carbons.

Figure 4B:
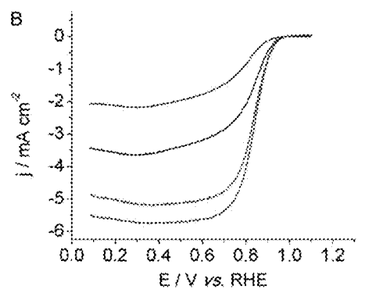
Figure 4C:
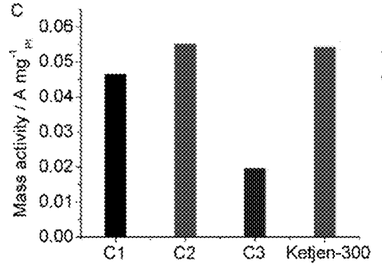
Figure 4D:
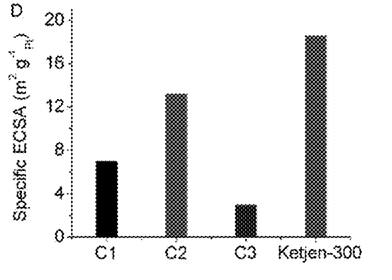
Figure 5A:
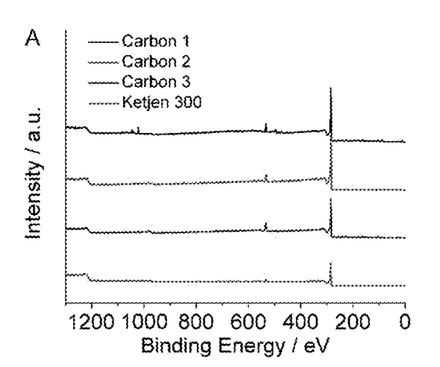
Figure 5B:
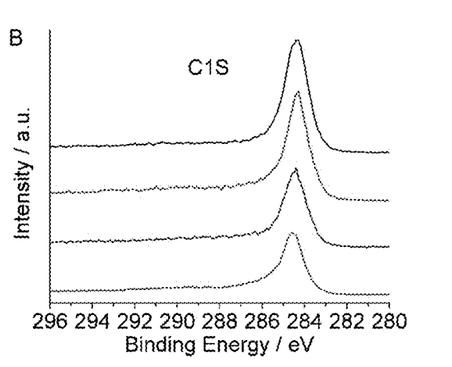
Figure 5C:
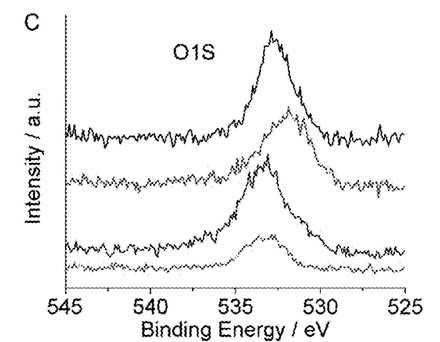
Figure 5D:
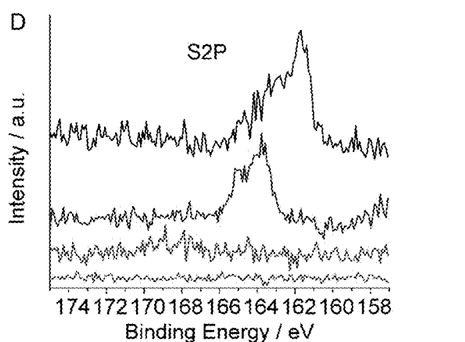

In order to understand the effect each carbon support has on the electrochemical activity, the mass activity ($j_{k,\ mass}$) was determined using the Koutecky-Levich equation and was normalized to the Pt mass and the ECSA for each carbon support. The positive-going polarization curves are shown in FIG. 4B and FIG. 7, going from 0.08 to 1.1 $V_{RHE}$. The mass activity of the Pt cubes on Carbon 2 and Ketjen-300 were nearly identical (0.055 A mg$^{-1}$), while the mass activity of the Pt cubes supported on Carbon 1 and 3 was significantly lower. The electron transfer number was also determined for each carbon at 0.4 V with results presented in Table 1. Carbon 1 and 2 had an electron transfer numbers of 2.9 and 2.7, respectively, while Carbon 2 and Ketjen-300 achieved electron transfer numbers of 3.9 and 4.0, respectively. An electron transfer number close to 4 indicates that nearly all electrons participate in the ORR to fully reduce $O_2$ to $H_2O$. A decrease in the electron transference number indicates that $O_2$ may not completely reduce to $H_2O$, but rather peroxides or other intermediates of the reaction. Taken collectively, the decrease in the specific ECSA, electron transfer number, and $j_{k,\ mass}$ values can be explained on the basis that the Pt nanocubes dispersed on Carbons 1 and 3 had a poorer dispersity and the fact that Pt metals could be potentially poisoned by the organosulfur impurities present on the surface of Carbon 1 and 3. Therefore, it is vital to remove organosulfur compounds, maximize the surface area, and boost the electronic conductivity in order to turn waste tires into useful supports for electrocatalysis.

It has been successfully demonstrated that carbon derived from waste tires can act as useful supports for electrocatalysis. Three separate tire-derived carbons were investigated for their textural, thermal, and electrical properties. By extracting liquid fuel at 200° C., pyrolyzing the carbon at 1100° C., and activating the carbon with KOH at 1100° C., crumb tire rubber was able to be efficiently converted to carbon black with an increased electrochemically active surface area, a decreased average pore diameter, low sulfur content, and good crystallinity. Using the ORR as an example, it was shown that Pt cubes could effectively perform the ORR when dispersed on tire-derived carbon. When benchmarked against Ketjen-300, a commercially-available carbon black used for electrolysis, the tire-derived carbon achieved a similar specific ECSAs, electron transfer numbers, and $j_{k,\,mass}$ values.

What is claimed is:

1. A method of making an electrocatalyst from waste tires, comprising the steps of:
    providing rubber pieces;
    contacting the rubber pieces with a sulfonation bath to produce sulfonated rubber;
    pyrolyzing the rubber to produce tire-derived carbon composite comprising
    carbon black, wherein the pyrolyzing comprises heating to at least 200° C.-2400° C.;
    activating the tire-derived carbon composite by contacting the tire-derived carbon composite with an alkali anion compound to remove sulphur to provide activated tire-derived carbon supports containing reduced amounts of thiophenic carbon groups; and
    loading the activated carbon supports with platinum cubes to form an electrocatalyst;
    wherein the electrocatalyst is sulphur free, has an electron transfer number greater than 3.9, has a specific electrochemical surface area (ECSA) of 2-13 $m^2g^{-1}$, and a mass activity 0.02-0.055 A mg.

2. The method of claim 1, wherein the temperature of the sulfonation bath is between −20° C. to 200° C.

3. The method of claim 1, wherein the rubber pieces are contacted with the sulfonation bath for between 30 minutes and 5 days.

4. The method of claim 1, wherein the pyrolyzing heating comprises a first stage heating comprises heating to between room temperature and 400° C. at 1° C./min, and a second stage heating comprises heating to between 400° C. and 2400° C. at 2° C./min.

5. The method of claim 1, wherein the pyrolyzing time is between 1 minute and 24 hours.

6. The method of claim 1, wherein the activating step comprises contacting the tire-derived carbon with an alkali anion compound.

7. The method of claim 1, wherein the alkali anion compound is $ZnC_{12}$.

8. The method of claim 1, wherein the alkali anion compound is $H_3PO_4$.

9. The method of claim 1, wherein the alkali anion compound is contacted with the carbon at a weight ratio of between 0.01-50 wt. %.

10. The method of claim 1, wherein the platinum is a platinum group metal.

11. The method of claim 10, wherein the platinum group metal is selected from the group consisting of palladium, rhodium, and ruthenium.

12. The method of claim 1, wherein a further catalyst is dispersed on the platinum cube activated carbon-based support.

13. The method of claim 12, wherein the catalyst is a transition metal or noble metal.

* * * * *